United States Patent [19] [11] 4,318,636
Thomas [45] Mar. 9, 1982

[54] TUNNEL LINING, SEGMENT THEREFORE AND METHOD OF LINING A TUNNEL
[75] Inventor: Norman S. Thomas, Market Drayton, England
[73] Assignee: Sheridan Contractors (Engineering) Limited, Birmingham, England
[21] Appl. No.: 29,473
[22] Filed: Apr. 12, 1979
[30] Foreign Application Priority Data
Apr. 12, 1978 [GB] United Kingdom ............... 14294/78
Jun. 9, 1978 [GB] United Kingdom ............... 26631/78
[51] Int. Cl.³ ......................................... E21D 11/00
[52] U.S. Cl. ..................................... 405/153; 52/584; 405/150
[58] Field of Search ............... 405/153, 150, 151, 152; 403/381, 331, 316; 256/65; 52/127, 762, 591, 594, 580, 284, 285, 588, 766, 767, 772, 584; 217/96, 65; 220/75, 76

[56] References Cited
U.S. PATENT DOCUMENTS 1,045,223  11/1912  Uhlinger ................................ 52/580
1,670,625   5/1928  Johannesson ..................... 405/153 X
1,982,307  11/1934  Kahn ..................................... 405/153
2,405,643   8/1946  Crot ................................... 52/762 X
2,886,278   5/1959  Opie ...................................... 256/65
2,962,133  11/1960  Kivett et al. ........................... 52/580
3,282,003  11/1966  Swift ................................. 52/584 X
3,330,082   7/1967  Webb ................................. 52/584 X

FOREIGN PATENT DOCUMENTS 689778   6/1964  Canada ................................. 405/153
 452327  11/1927  Fed. Rep. of Germany ...... 405/150
1292638  10/1972  United Kingdom ............... 405/153
1400004   7/1975  United Kingdom ............... 405/153

Primary Examiner—Dennis L. Taylor
Attorney, Agent, or Firm—Spencer & Kaye

[57] ABSTRACT

A tunnel lining comprises a plurality of arcuate segments connected to one another by connecting elements. Each connecting element protrudes from one segment and engages in a recess defined by an adjacent segment. Each recess is considerably larger than the connecting element and contains means for clamping the connecting element to one wall of the recess.

10 Claims, 8 Drawing Figures

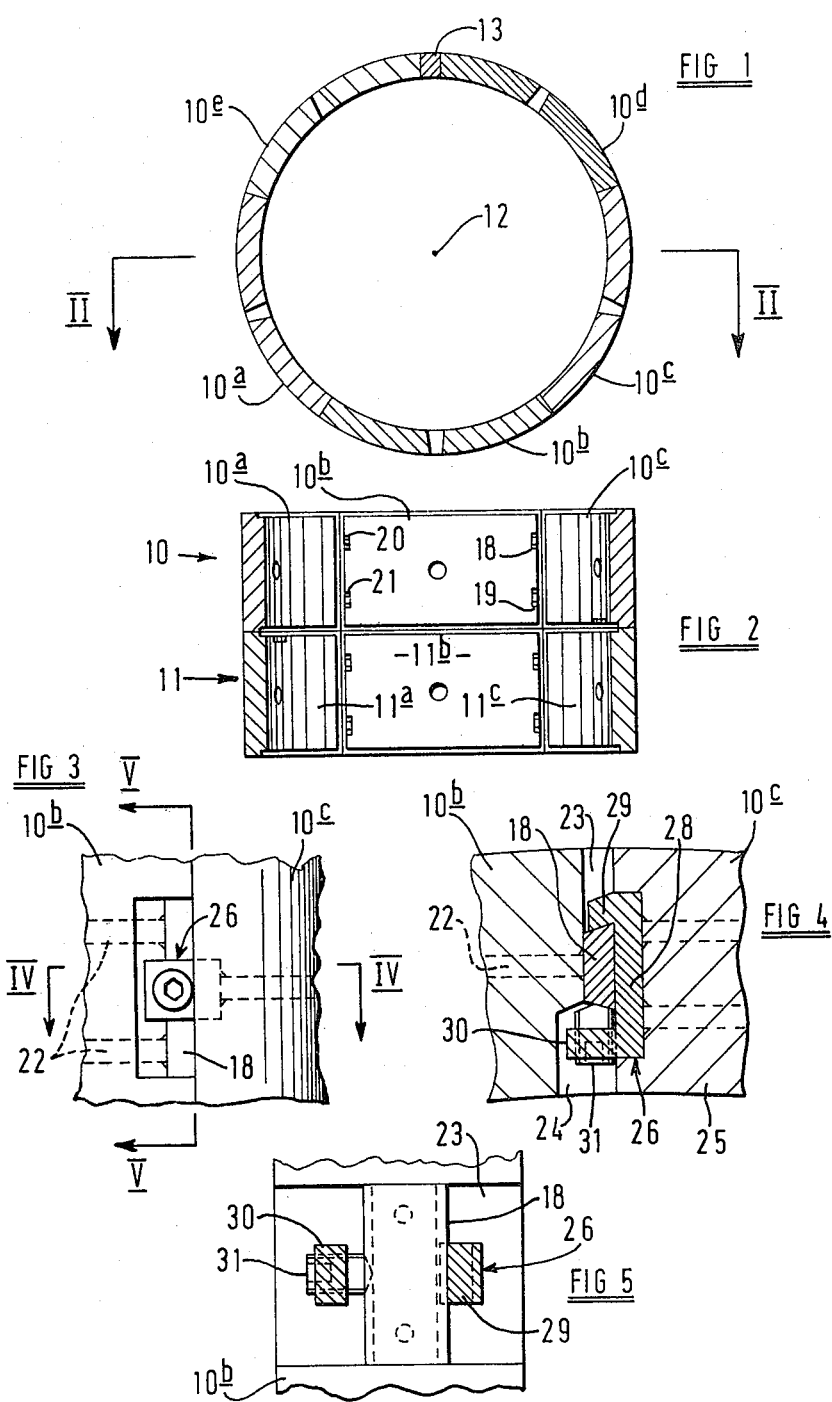

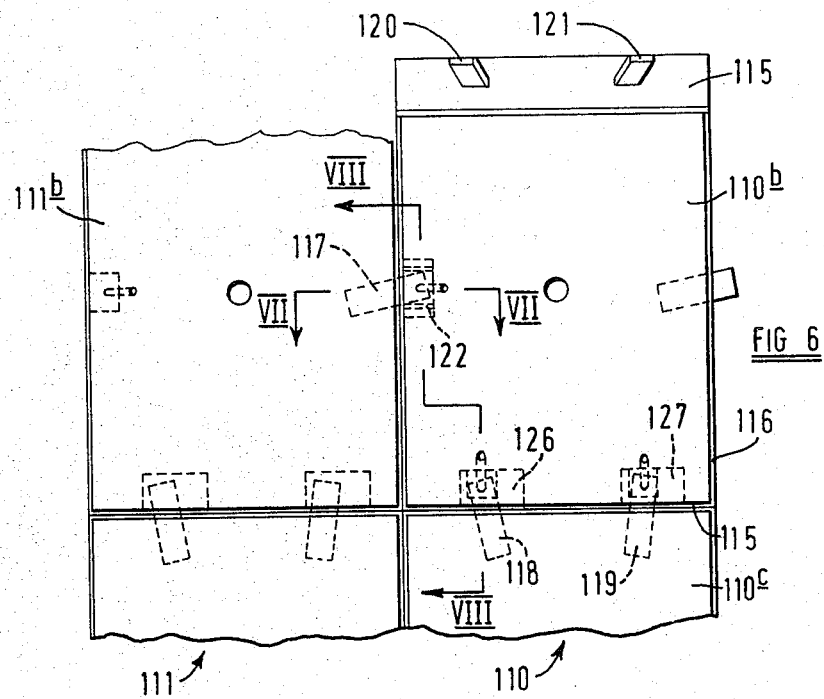
FIG 6
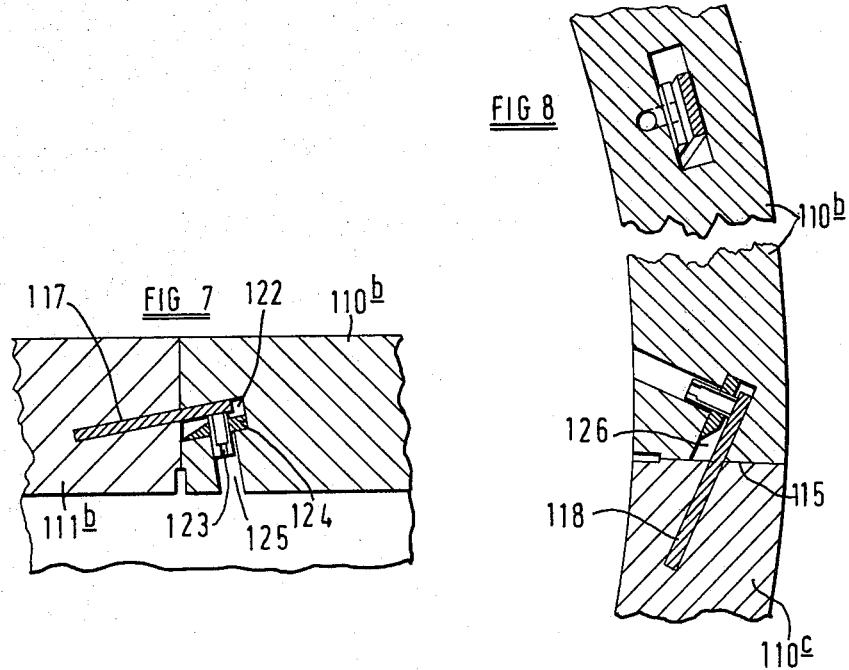
FIG 7
FIG 8

4,318,636

TUNNEL LINING, SEGMENT THEREFORE AND METHOD OF LINING A TUNNEL

BACKGROUND TO THE INVENTION

A first aspect of this invention relates to a tunnel lining comprising a plurality of arcuate segments, a number of which are assembled end-to-end to form a ring which constitutes a part of the length of a tunnel lining, each segment subtending at a longitudinal axis of the lining a respective angle less than 360°. The invention also relates to a method of lining a tunnel with pre-formed segments and to a segment for use in the lining.

It is a common procedure, when boring a tunnel through ground which is not constituted by rock, to line the tunnel as it is bored with pre-formed concrete segments. A number of segments are assembled end-to-end to form a complete, or a substantially complete annulus. A key block may be interposed between two adjacent segments of the ring. The number of segments provided in a ring depends upon the diameter of the lining and is typically five.

Any gap which is present between the exterior of the tunnel lining and the surface of the ground exposed by the boring operation is usually filled with a settable composition referred to in the art as grout. When set, the grout contributes significantly to the stability of the structure. However, it is necessary to ensure that relative movement of the assembled segments does not occur before the grout has set. Thus, it is usual to provide fastening elements for fastening adjacent segments to each other.

One difficulty which arises in the use of fastening elements for fastening adjacent segments to each other is that exact alignment of adjacent segments with each other is often impracticable. A number of arrangements have been proposed for fastening adjacent segments together but these previous proposals suffer from various disadvantages. One object of the present invention is the provision of improved means for fastening together adjacent segments in a tunnel lining.

SUMMARY OF THE INVENTION

According to a first aspect of the invention, there is provided a tunnel lining comprising a plurality of segments whereof at least some adjacent segments are connected together by respective connecting elements, each connecting element engaging in a recess defined by a respective segment of the lining.

The size of the recess may be such relative to the size of the connecting element that limited variations in the relative positions of adjacent segments do not prevent introduction of the connecting element into the recess.

Means may be provided for clamping the connecting element in the recess.

Each segment is preferably formed mainly of cementitious material and said associated segment preferably includes a non-cementitious body anchored in the cementitious material and defining a recess. The connecting element also is preferably formed of non-cementitious material, may be anchored in the cementitious material of a further segment and lie in a recess defined by the further segment and larger than the recess defined by the non-cementitious body. With this arrangement, that part of the non-cementitious body which defines the smaller recess can be inserted into the larger recess to introduce the connecting element into the smaller recess.

According to a second aspect of the invention, there is provided a segment for a tunnel lining, the segment having a recess to receive a projection from another segment when the two segments are assembled together. The segment may comprise a cementitious part and a non-cementitious part, the latter part defining the recess. Additionally, or alternatively, clamping means may be provided in the recess, the clamping means being operable to clamp the projection in the recess when the two segments are assembled together.

According to a third aspect of the invention, there is provided a method of lining a tunnel with curved segments, a plurality of which are assembled together to form a lining, wherein there is provided on a first segment adjacent to one boundary thereof a connecting element and there is defined in a second segment adjacent to one boundary thereof a recess and the segments are arranged with said boundaries thereof adjacent to each other and with the connecting element entering into the recess.

Two examples of tunnel lining in accordance with the invention will now be described with reference to the accompanying drawings wherein:

BRIEF DESCRIPTION OF THE DRAWINGS

FIG. 1 shows a transverse cross section of a first example of lining in accordance with the invention, FIG. 2 shows a cross section on the line II—II of FIG. 1, FIG. 3 shows on an enlarged scale certain parts shown in FIG. 2, FIG. 4 shows a cross section on the line IV—IV of FIG. 3, FIG. 5 shows a cross section on the line V—V of FIG. 3, FIG. 6 is a view similar to FIG. 2 of the second example of lining, FIG. 7 shows on an enlarged scale a fragmentary cross section on the line VII—VII of FIG. 6, and FIG. 8 shows on the scale of FIG. 7 a fragmentary cross section on the line VIII—VIII of FIG. 6.

DETAILED DESCRIPTION

The lining illustrated in FIGS. 1 to 5 of the accompanying drawings comprises a plurality of rings, for example the rings 10 and 11, which are identical with one another and are arranged in mutually abutting relation along the length of the tunnel. Each ring comprises a number of arcuate segments, five in the particular example shown. The ring 10 comprises the five segments 10a and 10e, which form an almost complete annulus, and a key block 13 disposed at the top of the lining between the segments 10d and 10c. The ring 11 similarly comprises five arcuate segments and a key block, only parts of the segments 11a, 11b and 11c of this ring being shown.

The segments have flat end surfaces which lie in radical planes of the lining. The segments also have flat side surfaces which lie in planes perpendicular to a longitudinal axis 12 of the lining. Ideally, the end surfaces and side surfaces of the segments are in full face-to-face contact with those of adjacent segments. In practice, when the segments are assembled together, there is often a certain amount of misalignment. For example, abutting end surfaces of two adjacent segments may overlap with each other only partly.

In the particular example illustrated, each segment of the ring 10 is arranged alongside only one segment of the ring 11 so that the end surfaces of that segment of the ring 10 are adjacent to the end surfaces of the corresponding segment of the ring 11. Each segment is connected to all of the four adjacent segments. Thus, the segment 10b is connected to the segments 10a and 10c, to the segment 11b and also to a segment of a further ring, when such ring is assembled at the side of the ring 10 remote from the ring 11. For connecting the segment 10b to the segment 11b, there is provided a single connecting element (not shown). A corresponding single connecting element is provided for connecting the segment 10b to the corresponding segment of the other adjacent ring. For connecting the segment 10b to the segment 10c there are provided two connecting elements 18 and 19 respectively and a further two connecting elements 20 and 21 are provided for connecting the segment 10b to the 10a. All of the connecting elements have the same form, that is a bar having a dove-tail cross section. All of the connecting elements are arranged in the same manner and therefore the arrangement of the connecting element 18 only will be described.

The connecting element 18 is formed of steel and is rigidly secured to a pair of rods 22 which extend from the smaller face of the connecting element and are perpendicular thereto. Each of the segments of the lining is formed mainly of cementitious material and the rods 22 are embedded in the cementitious material of the segment 10b to anchor the connecting element thereto. The connecting element is disposed in a recess formed in an end face of the segment 10b, this recess extending completely across the end face of the segment from the internal surface of the lining to the external surface thereof. Between the internal surface of the lining and the connecting element 18, the recess 23 has a deeper portion 24.

The segment 10c comprises a main part 25 formed of cementitious material and two bodies formed of steel, each of these bodies being partly embedded in the cementitious material and partly projecting from an end face of the segment presented towards the segment 10b. These bodies are identical with each other and accordingly only one of the bodies, identified by the reference numeral 26, will be described. The body 26 defines a recess to receive the connecting element 18. The other body defines a recess to receive the connecting element 19.

As viewed in FIG. 4, that is in cross section in a plane which is perpendicular to the longitudinal axis of the lining, the body 26 is approximately U-shaped having a flat base 28, a shorter limb 29 which is undercut and includes with the base an acute angle, and a longer limb 30 which is perpendicular to the base. The body also includes two rods rigidly secured to the base 28 and extending therefrom in a direction away from the recess defined by the body. These rods and the base itself are embedded in the cementitious part 25 of the segment with the limbs 29 and 30 projecting from the end face of the cementitious part.

For clamping the connecting element 18 in the recess defined by the body 26, there is provided a clamping element in the form of a grub screw 31 which extends through a screw threaded bore formed in the limb 30 into the recess defined by the body 26. The clamping element can be screwed towards and away from the limb 29. Prior to assembly of the segments with one another, the screw 31 is positioned with its tip just penetrating into the recess.

The dimension of the body 26 which extends parallel to the axis 12 of the lining is no greater than one-third of the corresponding dimension of the recess 23. Accordingly, it is possible to place the segment 10c on the segment 10b with the segment 10c spaced somewhat from the segment 11c whilst the segment 10b is in contact with the segment 11b. The connecting element 18 can be inserted into the recess defined by the body 26 and the connecting element 19 can be inserted into the corresponding recess and the bodies then moved across these recesses until the segment 10c engages the segment 11c. In this way, a connecting element on the segment 10c is inserted into a recess presented by the segment 11c. Each of the three connecting elements can then be clamped in the corresponding recess by operation of the appropriate grub screw. It will be seen that the limb 30 of the body 26 is disposed within the deeper portion 24 of the recess in the segment 10b and that although the grub screw is spaced radially outwardly somewhat from the internal surface of the lining, the grub screw is accessible to be driven by a suitable tool. Tightening of the grub screw drives the connecting element 18 against the undercut limb 29 so that the connecting element cannot subsequently move out of its recess in the body 26.

As shown in FIG. 4, the recess defined by the body 26 has an open mouth which faces circumferentially of the lining and through which the connecting element 18 extends into the recess. The limb 29 and the grub screw 31 are both undercut so that they define between them a gap which diverges in a direction away from the mouth of the recess and which can be adjusted by driving the screw 31 into or out of the recess. It can be seen from FIG. 4 that, when the connecting element 18 has been introduced into the recess defined by the body 28, the screw 31 can be driven into the recess to make the connecting element 18 captive in the recess. The surface of the limb 29 and the surface of the screw 31 which engaged the connecting element 18 are both inclined to a plane containing the longitudinal axis of the lining and intersecting these surfaces.

If some degree of freedom for limited movement of adjacent segments is required, the grub screws may be tightened sufficiently to prevent the connecting elements being withdrawn from their respective recesses but not so tightly as to prevent all relative movement of each connecting element and the body in which it is received.

The lining illustrated in FIGS. 6, 7 and 8 also comprises a plurality of rings, each having five arcuate segments and a key block. Parts of this lining which correspond to parts of the lining hereinbefore described with reference to FIGS. 1 to 5 are indicated in FIGS. 6 to 8 by like reference numerals with the prefix 1 and the preceding description is deemed to apply except for the differences hereinafter mentioned.

The connecting elements of the lining illustrated in FIGS. 6 to 8, two of which are indicated by the reference numerals 117 and 118, all have the form of a rectangular plate having a length approximately three times its width. As seen in FIGS. 6 and 7, a part of the element 117 is disposed in a recess in the segment 111b and a further part of the connecting element which projects from the segment 111b is received in a recess 122 in the segment 110b. The recess in the segment 111b has a size and shape such that the connecting element is a close sliding fit in the recess. The element can be inserted into the recess by hand pressure but, once fully inserted is constrained against movement relative to the segment 111b other than withdrawal from the recess in a direction along the length of the element. As can be seen from FIGS. 6 and 7, when the element 17 is disposed in its recess in the segment 111b the element is inclined to the adjacent side surface 116 of the segment at an acute angle in each of two directions. Thus, the connecting element is inclined to the axis of the rings 10 and 11 in such a manner that the projecting part of the element lies further from that axis than does the part of the element received in the recess of segment 111b. Also, the projecting part of the element 17 is spaced further from the segment 10c than the part of the element received in the segment 111b is spaced from the segment 111c. It will be understood that this inclination of the element 117 and its recess in the segment 111b prevents the element being withdrawn from that recess by movement in a direction parallel to the axis of the rings 110 and 111.

The recess 122 has a size and shape such that, when the corresponding part of the element 117 is fully inserted into the recess 122, there is freedom for limited relative movement of the connecting element and segment 110b both in a direction towards and away from the axis of the rings and in a direction around that axis, these directions being substantially perpendicular to the direction of relative movement during insertion of the element 117 into the recess 122 and also substantially perpendicular to each other. Within the recess 122 there is disposed a clamping element in the form of a socket screw 123 for clamping the connecting element 117 against a radially outermost wall of the recess. A screw threaded shank of the screw 123 is in threaded engagement with a retaining plate 124 also disposed within the recess 122 and lying against a radially outwardly facing wall thereof. A head of the screw 123 is disposed within a cylindrical branch 125 of the recess, which branch emerges at the radially inwardly facing surface of the segment 110b.

The screw 123 can be driven towards the connecting element 117 by means of a suitable tool inserted into the branch 125 from the interior of the ring 110 and engaged with the head of the screw. It will be noted that the branch 125 presents a relatively small aperture at the interior of the ring 110 and this aperture can readily be plugged after assembly of the lining. In the assembled lining, the screw 123 holds the connecting element 117 against the radially outermost wall of the recess 122. It will be noted that the face of this wall is inclined to the axis of the rings 110 and 111 in such a manner that the element cannot be withdrawn from the socket 122 by relative movement of the element and segment 110b in the axial direction. Relative movement of the connecting element and segment 110b in a tangential direction is inhibited by friction between the element 117 on the one hand and the clamping screw 123 and wall of the recess 122 on the other hand.

The connecting elements 118 and 119 are arranged in a similar manner to the connecting element 117. The elements 118 and 119 are each received partly in a respective recess in the segment 110c and these recesses are both inclined at an acute angle to the tangent to the ring 110 at the end surface 115 of the segment 110b. Thus, as shown in FIG. 8, those parts of the elements 118 and 119 which project from the segment 110c lie further from the axis of the rings 110 and 111 than do the parts received in the segment 110c. The elements 118 and 119 are also inclined to the tangent in directions along the lining so that the projecting parts of the elements and 119 are spaced further from each other than are those parts of the elements which are received in the segment 110c. Neither of these connecting elements can be withdrawn from its respective recess in the segment 110c by relative movement along the adjacent tangent. Those parts of the element 118 and 119 which project from the segment 110c are received in respective recesses 126 and 127 which are sufficiently large to provide for limited movement of the segment 110b relative to the elements 118 and 119 after these elements have been received in the recesses 126 and 127. In the recesses 126 and 127, there are provided clamping screws similar to the clamping screw 123. These clamping screws also are accessible from the inside of the ring 110 and can be driven, by means of a suitable tool, in a generally outward direction to clamp the elements 118 and 119 against radially outermost walls of the recesses 126 and 127 respectively.

The connecting elements 120 and 121 are arranged in the same manner as the elements 118 and 119, with the exception that the elements 120 and 121 are received in recesses in the segment 110b within which they are a close sliding fit. Those parts of the elements 120 and 121 which project from the segment 110b are received in and clamped in somewhat larger recesses formed in the segment 110a. The connecting element at the side surface 116 of the segment 110b which is remote from the segment 111b is arranged in the same manner as is the element 117, with the exception that this further element is received in a recess in the segment 110b within which it is a close sliding fit.

The segments of the lining illustrated in FIGS. 6 to 8 are formed of concrete by a casting process, suitable cores being provided in the mould to form the recesses for receiving the connecting elements. The clamping screws 123 and associated plates 124 are fitted in the larger recesses subsequently. This may be done either before or after transportation of the segments to the site at which they are to be used. The connecting elements are not fitted into recesses in the segments until the latter have been assembled in position in the tunnel. This avoids the risk of damage being caused to the connecting elements during transport of the segments and movement of the segments into the required positions in the tunnel.

A segment, for example the segment 110b is prepared to receive a further segment adjacent to one of its ends, for example the segment 110a by placing two connecting elements in the recesses at the appropriate end surface of the segment 110b. The segment 110a is then fitted over the projecting parts of the connecting elements so that these are received in the appropriate recesses. It will be noted that exact alignment of the segment 110a with the segment 110b is not necessary, owing to the relatively large size of the recesses in which the projecting parts of the connecting elements are received. A part of a connecting element which projects from the ring 111 is received in a recess in a side face of the segment 110a again with a substantial clearance. After the segment 110a has been placed in position, the parts of the connecting elements received therein are clamped in the corresponding recesses. This tends to displace the segment 110a in a direction towards the axis of the rings. The plates 124 are tapered in a direction towards the open mouth of the corresponding recesses so that these plates do not obstruct entry of the connecting elements into the recesses.

For connecting the segment 110b to the segment 111b and each other segment of the ring 110 to the ring 111, there may be provided two connecting elements arranged as the elements 118 and 119, instead of the single element 117.

In both examples of lining hereinbefore described, the recesses in which the connecting elements are received with substantial clearance are preferably sufficiently large to enable the connecting elements to enter the recesses when there is misalignment between the corresponding segments of an amount up to the corresponding dimension of the connecting element concerned. Thus, the misalignment in the direction of the thickness of a connecting element may be equal to that thickness and the misalignment in a direction of the width of a connecting element may be as great as that width.

The relative sizes of the connecting elements and recesses in which they are received are preferably such that it is possible to assemble the segments and connecting elements to form the lining whilst adjacent segments are out of exact alignment by a distance exceeding 1/240 of the inside diameter of the lining and more preferably exceeding 1/120 of the inside diameter of the lining. The relative sizes of the connecting elements and recesses may be such that it is possible to assemble the segments and connecting elements to form the lining whilst adjacent segments are out of exact alignment by a distance up to 10 mm.

Assembly of the lining is facilitated by the tolerance of the arrangement to misalignment at the stage when segments are positioned adjacent to each other. After the connecting elements have been received in their respective recesses, the clamping means are tightened and the relative positions of the segments are adjusted as necessary to reduce the degree of misalignment to an acceptable level. During such adjustment, the connecting elements contribute to the stability of the structure by substantially eliminating the risk of excessive relative movement of adjacent segments.

After the segments have been properly aligned and the clamping means tightened, grout is applied to the exterior of the lining to fill any gap between the lining and the periphery of the tunnel and grout is also applied internally to fill at least parts of the recesses adjacent to the internal face of the lining and provide a smooth internal surface on the lining.

I claim:

1. A segment for a tunnel lining, the segment having a projection and a recess to receive the projection from another identical segment when the two segments are assembled together, wherein the segment defines an open mouth of the recess, the segment has a surface which extends from said mouth to define one boundary of the recess, the segment has a clamping element which is movable into the recess towards said surface from an opposite boundary of the recess and said surface and the clamping element are undercut to define between them an adjustable gap which diverges in a direction away from the mouth of the recess.

2. A method of lining a tunnel with curved segments, a plurality of which are assembled together to form a lining, wherein there is provided on a first segment adjacent to one boundary thereof a connecting element, there is defined in a second segment adjacent to one boundary thereof a recess, the second segment is provided with a clamping element for clamping the connecting element in the recess the segments are arranged with said boundaries thereof adjacent to each other and with the connecting element entering into the recess and, while the connecting element is disposed in the recess, the relative position of the first and second segments is adjusted in a direction along the lining and in a direction transverse to a longitudinal axis of the lining and the connecting element is clamped in the recess.

3. A method according to claim 2 wherein, after the connecting element has entered the recess, the connecting element is made captive in the recess by operation of the clamping element and the position of one segment relative to the other is then adjusted in a direction radially of the lining by operation of the clamping element.

4. A tunnel lining comprising a plurality of segments wherein one of said segments has a connecting element which is fixed with respect to the one segment, a part of the connecting element engages in a recess defined by surfaces of an adjacent segment and wherein the extent of said part of the connecting element in a direction along the lining exceeds the corresponding extent of the recess.

5. A lining according to claim 4 wherein said adjacent segment includes a body having an approximately 'U' shaped cross section in a plane perpendicular to the axis of the lining and having an open mouth facing towards the segment from which the connecting element projects and wherein said body defines said recess.

6. A tunnel lining comprising a plurality of segments whereof at least some adjacent segments are connected together by respective connecting elements, each connecting element engages in a recess defined by surfaces of an associated segment of the lining and further comprising, for each connecting element a respective clamping element which is operable after the connecting element has been introduced into the recess for displacing the connecting element relative to said segment in a first direction and maintaining the connecting element in engagement with a boundary of the recess furthest from the axis of the lining wherein said boundary of the recess furthest from the axis of the lining is inclined to a plane containing that axis and intersecting said boundary and the connecting element is clamped against said boundary by the clamping element.

7. A curved segment for use in a tunnel lining, the segment having a connecting element, a recess to receive the connecting element of another identical segment when the two segments are assembled together and a clamping element movable into the recess towards a boundary of the recess for clamping the connecting element of the other segment against said boundary, wherein means is provided for guiding the clamping element for movement towards said boundary in a direction away from an axis of the lining when the segment is used in said lining.

8. A tunnel lining according to claim 4 wherein said adjacent segment defines open ends of the recess facing along an axis of the lining and wherein said connecting element protrudes from at least one of said open ends.

9. A method of lining a tunnel with curved segments, a plurality of which are assembled together to form a lining, wherein there is provided on a first segment adjacent to one boundary thereof a connecting element, there is defined in a second segment adjacent to one boundary thereof a recess, the segments are arranged with said boundaries thereof adjacent to each other and with the connecting element entering into the recess, opposite faces of the connecting element are engaged by respective undercut formations in the recess and the relative position of said segments is adjusted while said opposite faces are so engaged.

10. A method of lining a tunnel with curved segments wherein
   (a) there is provided on one of a first and second of said segments adjacent to one boundary thereof, a connecting element which is rigid with respect to said one segment;
   (b) there is defined in the other of the first and second segments, adjacent to one boundary thereof, a recess;
   (c) a number of further segments are assembled together to form a first ring defining an axis of the lining;
   (d) said first segment is assembled with said first ring to form a part of a second ring;
   (e) said second segment is moved to a position adjacent to said first ring and to insert said connecting element in said recess;
   (f) while said connecting element is in said recess, the second segment is moved axially along the lining upto said first ring;
   (g) said connecting element is driven relative to said other segment in a direction away from said axis into engagement with a radially inwardly facing boundary of the recess, thereby effecting radial adjustment of said second segment relative to said first segment; and
   (h) said connecting element is clamped against said boundary of the recess sufficiently firmly to restrain axial, radial and circumferential displacement of the second segment relative to the first segment.

* * * * *